April 11, 1944.   J. R. FORTIER   2,346,373
DIAMOND TOOL
Filed Jan. 9, 1942
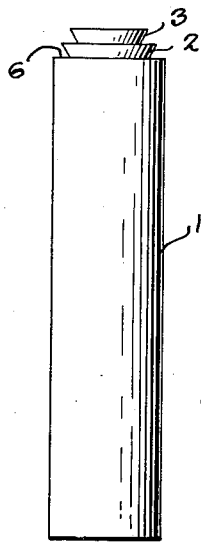
Fig. 1.
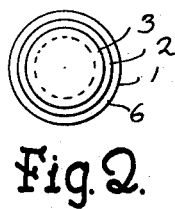
Fig. 2.
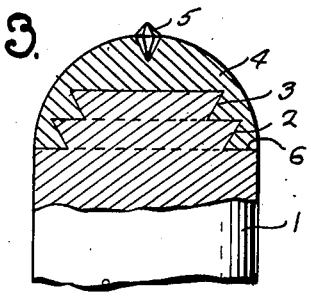
Fig. 3.
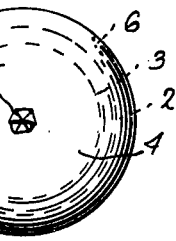
Fig. 4.
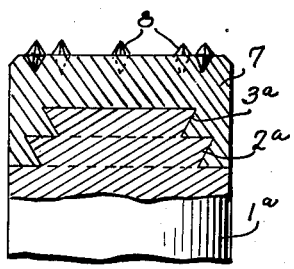
Fig. 5.
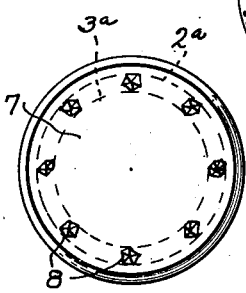
Fig. 6.
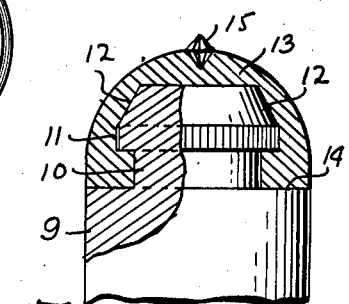
Fig. 7.
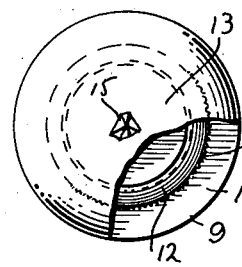
Fig. 8.
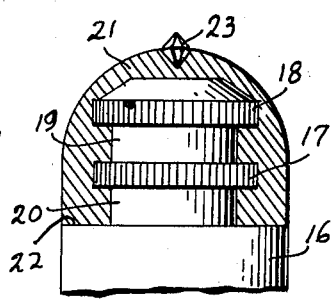
Fig. 9.
Fig. 10.
INVENTOR.
James R. Fortier
BY
Attorney Patented Apr. 11, 1944

2,346,373

UNITED STATES PATENT OFFICE 2,346,373

DIAMOND TOOL

James R. Fortier, Detroit, Mich.

Application January 9, 1942, Serial No. 426,183

3 Claims. (Cl. 125—39)

This invention relates to diamond holding tools such as are employed in cutting and finishing operations, and has for its object to provide an improved tool the essence of which improvement resides in an improved means of securing the diamond to the tool shank.

It is conventional practice in making shanks for tools of this type to drill a hole of substantial depth in one end thereof. A soft metal alloy is employed to secure the diamond to the shank, the alloy being generally of bullet-nosed shape having a projection inserted in the shank hole for anchorage. It is expensive to form this hole and it is difficult to maintain the hole centered with the result that the manufacture of such shanks is a slow, expensive and comparatively tedious job.

The object of this invention is to provide a shank to which the diamond holding alloy may be attached which will obviate the hole and which will give an improved anchorage for the alloy. The improvement consists in forming an undercut end portion of reduced size directly on the shank. The construction herein recommended can be made on a high speed machine as by the use of an automatic screw machine.

More particularly it is an object to provide a tool shank composed of a body proper having an undercut end portion which may be made in multiples and which may be knurled or otherwise roughened to provide an excellent attachment for the diamond holding material to the shank.

Other objects and advantages will become more fully apparent as reference is had to the accompanying drawing, wherein my invention is illustrated, and in which Fig. 1 is a side elevation of my improved tool shank, Fig. 2 is an elevation of the upper end of the shank of Fig. 1, Fig. 3 is a fragmental side elevation partially in section of the end of a tool having my improved shank, Fig. 4 is an end elevation of Fig. 3, Fig. 5 is a view similar to Fig. 3 showing another type of tool employing my improved shank, Fig. 6 is an elevation of the tool of Fig. 5, Fig. 7 is a view similar to Fig. 3 showing a modified form of shank, Fig. 8 is an end elevation partially broken away of the tool of Fig. 7, Fig. 9 is a view similar to Fig. 7 showing a further modified form of shank, and Fig. 10 is an end elevation, partially broken away of the tool of Fig. 9.

More particularly, 1 indicates the shank for a diamond tool used in making cuts and finishing cuts. The shank is composed of the body portion or shank proper to which the numeral 1 is actually applied and an end portion composed of two frusto-cones 2 and 3 stacked in series with their smaller bases toward the shank proper. The bases of the frusto-cone 2 are larger than the corresponding bases of the frusto-cone 3. A mass of material preferably in the form of some softer metal such as brass or bronze, is applied over the end 2, 3 of the shank and formed into a shape which may be described as bullet-nosed, as indicated at 4. A diamond 5, suitable for use as a cutter, is embedded in and suitably secured in the soft metal 4 in any desired or convenient manner, as is well-known in the art. The double under cut shape of the end 2, 3 serves as a mechanical bond, the material 4 finds abutting rest against the end shoulders 6 of the shank proper and there may also be some union between the soft metal and the shoulders 6 somewhat similar to that obtained by brazing or soldering so that, altogether, a very strong construction results.

The same shank, above-described, may be employed for a tool requiring a multiplicity of diamonds as illustrated in Figs. 5 and 6 in which the shank 1a has the two frusto-cones 2a and 3a enveloped by a mass of soft material 7 built up in extension of the sidewalls of the shank 1a. This soft metal end is flattened and the desired number of diamonds 8 embedded therein.

Figs. 7 and 8 illustrate a modification of the shank end. In this case the shank proper 9 has a cylindrical neck projection 10 of substantially reduced diameter which is integral with a knurled cylindrical portion 11 of larger diameter than the neck portion 10 but of smaller diameter than the shank proper 9. This knurled portion terminates in a bevelled upper end portion 12. A bullet-nosed mass of soft metal 13 overlies all portions 10, 11 and 12, and contacts the shank shoulders 14. A single diamond 15 is secured in the outer end of the soft metal 13. It is believed obvious that the soft metal 13 may be given the shape of the soft metal 7, as described.

Figs. 9 and 10 illustrate a modification of the type illustrated in Figs. 7 and 8 in which a shank body 16 has an end composed of two knurled portions 17 and 18 joined by a neck portion 19 with a second neck portion 20 connecting the portion 17 with the shank body 16. A soft metal covering 21 envelops the total ends 17, 18, 19 and 20 and rests against the shank shoulders 22. A diamond 23 is secured in the outer end of the soft metal 21. The two knurled portions 17 and 18 are preferably, although not necessarily, of equal diameter and of less diameter than the shank proper 16.

It is believed obvious that this soft metal 21 may be shaped similarly to the soft metal 7 to receive a plurality of diamonds.

It is also contemplated that stones other than diamonds and that hard alloys may be used in place of diamonds herein described, that it will be understood in the specification and in the claims where the expression "diamonds" appears that it applies to all other equivalent materials.

Although specific embodiments of the invention have been illustrated and described, it will be understood that various changes may be made within the scope of the appended claims without departing from the spirit of the invention, and such changes are contemplated.

What I claim is:

1. In a diamond tool, the combination of a shank comprising a solid body portion and an end portion of reduced diameter projecting outwardly therefrom, said end portion being in the shape of a frusto-cone with its smaller base secured to said body portion, an alloy completely overlying said end portion, and a diamond fixedly secured in said alloy and intersected by the axis of said shank.

2. In a diamond tool, the combination of a shank comprising a solid body portion and an end portion of reduced diameter projecting outwardly therefrom, said end portion being in the shape of a stack of frusto-cones, each of which has its smaller base toward said body portion, soft metal completely overlying and integrally secured to said end portion, and a diamond securely held by said soft metal.

3. A shank for a diamond holding tool comprising a solid cylindrical body portion and a reduced end portion in the shape of a stack of frusto-cones each having its smaller base toward said body portion and with the diameter of both larger and smaller bases progressively decreasing outwardly of said body portion.

JAMES R. FORTIER.